(12) United States Patent
Hara

(10) Patent No.: US 8,896,729 B2
(45) Date of Patent: Nov. 25, 2014

(54) IMAGE PROCESSING APPARATUS AND IMAGE PROCESSING METHOD

(71) Applicant: Canon Kabushiki Kaisha, Tokyo (JP)

(72) Inventor: Takayuki Hara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 13/626,256

(22) Filed: Sep. 25, 2012

(65) Prior Publication Data

US 2013/0120620 A1 May 16, 2013

(30) Foreign Application Priority Data

Nov. 11, 2011 (JP) .................................. 2011-247965

(51) Int. Cl.

| | |
|---|---|
| *H04N 9/64* | (2006.01) |
| *H04N 5/217* | (2011.01) |
| *H04N 5/228* | (2006.01) |
| *H04N 5/202* | (2006.01) |
| *H04N 5/357* | (2011.01) |

(52) U.S. Cl.
CPC ............ *H04N 5/202* (2013.01); *H04N 5/3572* (2013.01); *H04N 5/217* (2013.01)
USPC .......................... 348/251; 348/241; 348/222.1

(58) Field of Classification Search
CPC . H04N 5/23229; H04N 5/202; H04N 5/3572; H04N 5/217; H04N 9/77; H04N 5/357; H04N 1/4076; H04N 5/235; G06T 5/00; G06T 5/007; G06T 5/009; G06T 2207/20208; G06T 5/56

USPC ....................................... 348/222.1, 234–251
See application file for complete search history.

(56) References Cited

U.S. PATENT DOCUMENTS

| | | | | |
|---|---|---|---|---|
| 4,858,023 | A * | 8/1989 | Tada ............................. | 358/471 |
| 5,828,793 | A * | 10/1998 | Mann ............................ | 382/284 |
| 7,646,411 | B2 * | 1/2010 | Igarashi ........................ | 348/254 |
| 2002/0135688 | A1* | 9/2002 | Niikawa ........................ | 348/251 |
| 2004/0051790 | A1* | 3/2004 | Tamaru et al. ............. | 348/223.1 |
| 2004/0141087 | A1* | 7/2004 | Oda et al. ...................... | 348/340 |
| 2007/0070223 | A1* | 3/2007 | Tamaru et al. ............... | 348/255 |
| 2011/0279710 | A1* | 11/2011 | Lee ............................... | 348/234 |

FOREIGN PATENT DOCUMENTS

| | | |
|---|---|---|
| JP | 11-168659 | 6/1999 |
| JP | 2005-277618 | 10/2005 |

* cited by examiner

*Primary Examiner* — Timothy J Henn
*Assistant Examiner* — Pritham Prabhakher
(74) *Attorney, Agent, or Firm* — Cowan, Liebowitz & Latman, P.C.

(57) ABSTRACT

An image processing apparatus has an input unit for inputting an image captured by an image sensor, a shading correction amount calculation unit for calculating per pixel a shading correction amount to be applied to the image inputted from the input unit, a γ correction gain calculation unit for calculating a γ correction gain depending on the shading correction amount and pixel values of the image sensor pixels, and a gain correction unit for applying gain correction to the pixel values based on the γ correction gain, wherein shading correction and γ correction are performed simultaneously by the gain correction with the gain correction unit.

2 Claims, 10 Drawing Sheets

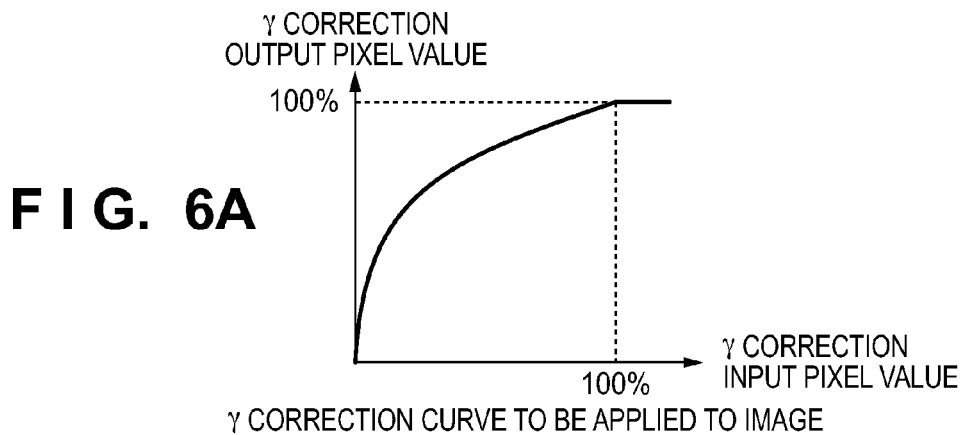
FIG. 6A γ CORRECTION CURVE TO BE APPLIED TO IMAGE
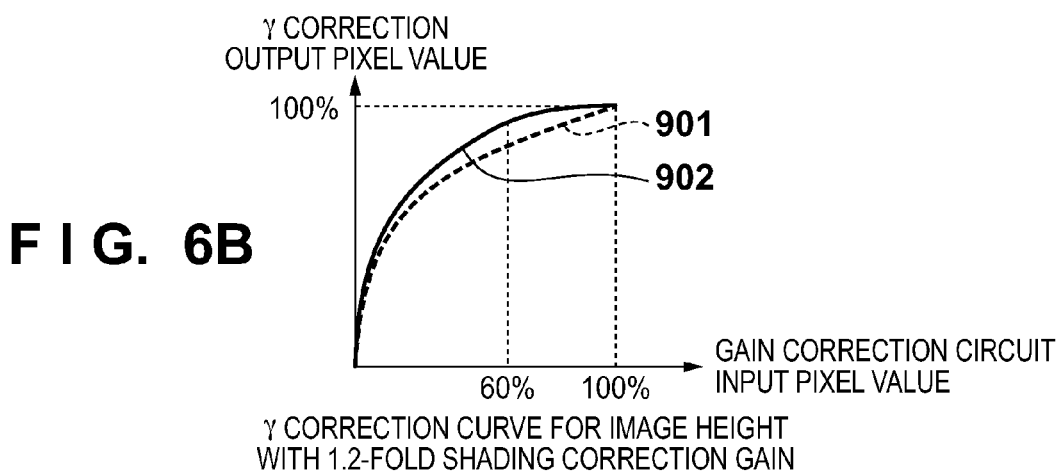
FIG. 6B γ CORRECTION CURVE FOR IMAGE HEIGHT WITH 1.2-FOLD SHADING CORRECTION GAIN
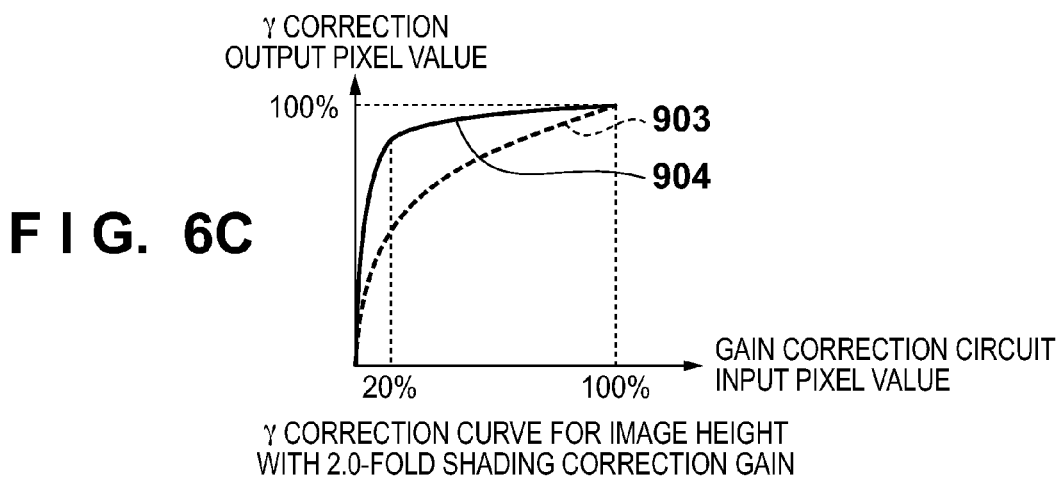
FIG. 6C γ CORRECTION CURVE FOR IMAGE HEIGHT WITH 2.0-FOLD SHADING CORRECTION GAIN γ CORRECTION CURVE EMPHASIZING CONTRAST
FOR IMAGE HEIGHT WITH 1.2-FOLD SHADING CORRECTION GAIN γ CORRECTION CURVE EMPHASIZING GRADATION PROPERTIES
FOR IMAGE HEIGHT WITH 1.2-FOLD SHADING CORRECTION GAIN

γ CORRECTION CURVE TO BE APPLIED TO IMAGE

γ CORRECTION CURVE FOR IMAGE HEIGHT WITH 1.2-FOLD SHADING CORRECTION GAIN

γ CORRECTION CURVE FOR IMAGE HEIGHT WITH 2.0-FOLD SHADING CORRECTION GAIN

γ CORRECTION CURVE EMPHASIZING CONTRAST
FOR IMAGE HEIGHT WITH 1.2-FOLD SHADING CORRECTION GAIN

γ CORRECTION CURVE EMPHASIZING GRADATION PROPERTIES
FOR IMAGE HEIGHT WITH 1.2-FOLD SHADING CORRECTION GAIN

F I G. 12
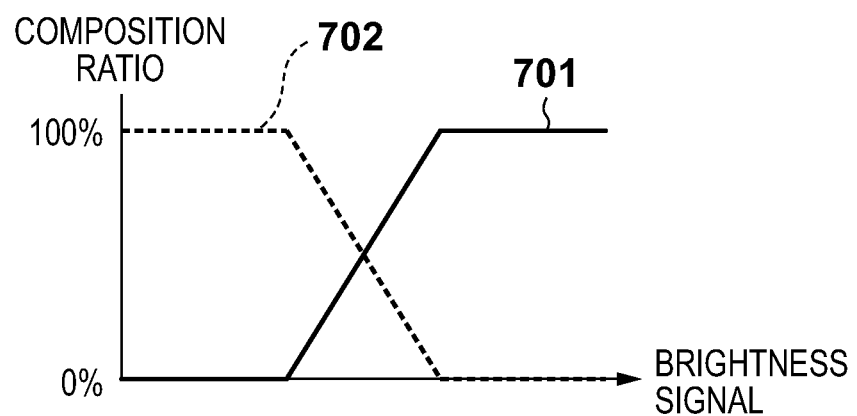

IMAGE PROCESSING APPARATUS AND IMAGE PROCESSING METHOD

BACKGROUND OF THE INVENTION

1. Field of the Invention

The present invention relates to the technology of shading correction processing.

2. Description of the Related Art

In imaging devices that capture images by means of an image sensor, problems exist for a disparity in pixel position that arises in the brightness of a subject image formed, due to factors such as speed differences between the first and second curtains of a shutter, or decreased marginal illumination due to the characteristics of an imaging lens. Correcting these disparities of brightness is generally known as shading correction. For example, correction of shading occurring due to the movement of a light-shielding means is referred to in Japanese Patent Laid-Open No. 11-168659, and correction of shading due to the decreased marginal illumination of a lens in Japanese Patent Laid-Open No. 2005-277618.

However, in the conventional case of performing a shading correction as mentioned above, there has been the problem that, when a subject of high luminance had been image-formed at the pixel position subjected to shading, detail is lost due to high-luminance portions exceeding a saturation value upon carrying out the shading correction.

SUMMARY OF THE INVENTION

The present invention has been made in view of the problems mentioned above, to prevent detail from being lost due to saturation of high-luminance portions when shading correction is performed.

According to a first aspect of the present invention, an image processing apparatus has an input unit for inputting an image captured by an image sensor, a shading correction amount calculation unit for calculating per pixel a shading correction amount to be applied to the image inputted from the input unit, a γ correction gain calculation unit for calculating a γ correction gain depending on the shading correction amount and pixel values of the image sensor pixels, and a gain correction unit for applying gain correction to the pixel values based on the γ correction gain, wherein shading correction and γ correction are performed simultaneously by the gain correction with the gain correction unit.

According to a second aspect of the present invention, an image processing apparatus has an input unit for inputting an image captured by an image sensor, a shading correction amount calculation unit for calculating per pixel a shading correction amount to be applied to the image inputted from the input unit, a shading correction unit for carrying out shading correction based on the shading correction amount, a γ correction gain calculation unit for calculating a γ correction gain based on the shading correction amount, and a γ correction unit for applying γ correction to the output of the shading correction unit, based on the γ correction gain.

According to a third aspect of the present invention, an image processing method has an input step of inputting an image captured by an image sensor, a shading correction amount calculation step of calculating per pixel a shading correction amount to be applied to the image inputted by the input step, a γ correction gain calculation step of calculating a γ correction gain depending on the shading correction amount and pixel values of the image sensor pixels, and a gain correction step of applying gain correction to the pixel values based on the γ correction gain, wherein shading correction and γ correction are performed simultaneously by the gain correction with the gain correction step.

According to a fourth aspect of the present invention, an image processing method has an input step of inputting an image captured by an image sensor, a shading correction amount calculation step of calculating a shading correction amount per pixel to be applied to the image inputted by the input step, a shading correction step of carrying out shading correction based on the shading correction amount, a γ correction gain calculation step of calculating a γ correction gain based on the shading correction amount, and a γ correction step of applying γ correction to the output of the shading correction step, based on the γ correction gain.

Further features of the present invention will become apparent from the following description of exemplary embodiments with reference to the attached drawings.

BRIEF DESCRIPTION OF THE DRAWINGS

FIGS. 6A to 6C are diagrams showing examples of adjusting the γ correction curve in the first embodiment.

FIG. 12 is a diagram showing the relationship between brightness signal and composition ratio in an HDR composition circuit.

DESCRIPTION OF THE EMBODIMENTS

Below, embodiments of the present invention will be described in detail with reference to the drawings.

(First Embodiment)

Figure 1:
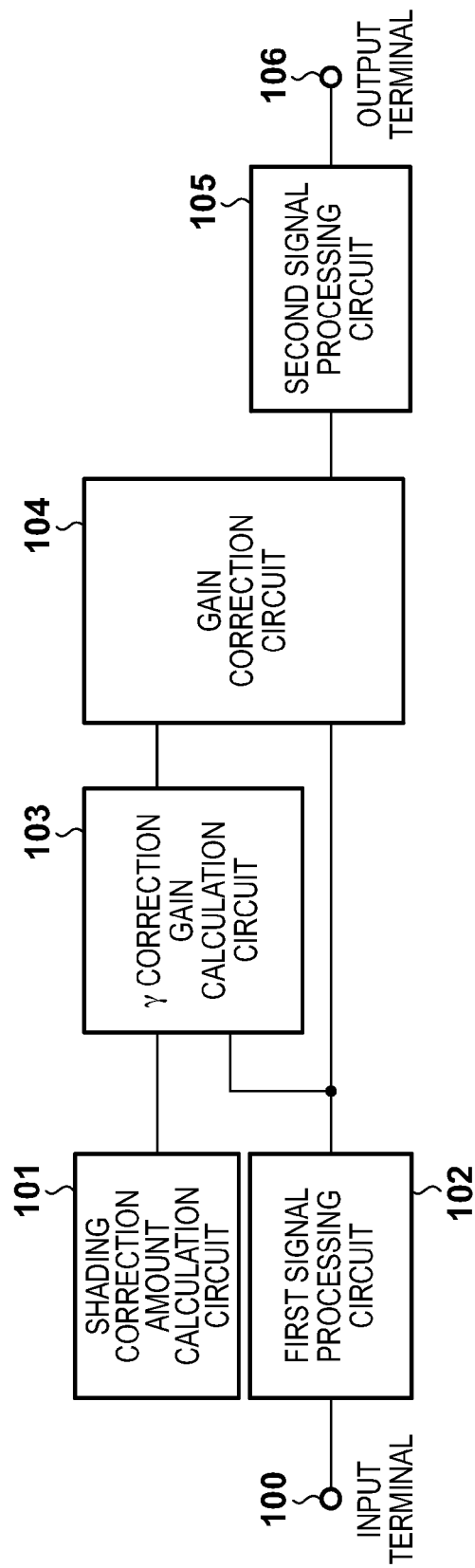
FIG. 1 is a block diagram of an image processing apparatus according to a first embodiment of the present invention.

FIG. 1 is a block diagram of an image processing apparatus according to a first embodiment of the present invention.

The image processing apparatus includes an input terminal 100 for inputting an image captured by an image sensor, and a shading correction amount calculation circuit 101 for calculating a shading correction amount per pixel to be applied to the image inputted from the input terminal 100. The image processing apparatus also includes a γ correction gain calculation circuit 103 for calculating a γ correction gain depending on the shading correction amount and the pixel values, and a first signal processing circuit 102 for carrying out pre-γ signal processing on the image inputted from the input terminal 100. Also, the image processing apparatus includes a gain correction circuit 104 for applying gain correction to the output image signal of the first signal processing circuit 102 based on the γ correction gain. Further, the image processing apparatus includes a second signal processing circuit 105 for carrying out post-γ correction signal processing with respect to the output of the gain correction circuit 104, and an output terminal 106 for outputting the signal of the second signal processing circuit 105.

The image input from the input terminal 100 is an image formed by an imaging system involving shading. The present embodiment is described on the assumption that shading occurs due to decreased marginal illumination caused by the optical characteristics of an imaging lens. However, the present embodiment is not limited only to this kind of shading but shall extend to shading that occurs due to a disparity in speed of operation between the first and second curtains of a shutter, and in general to all cases where, when a subject of uniform luminance is photographed, differences in luminance occur in the image formed.

Shading due to decreased marginal illumination (denoted in the following as shading) refers to a situation where, when a subject of uniform luminance is photographed, image forming results in a luminance level distribution shaped, for example, as in FIG. 2. The X-axis and Y-axis in FIG. 2 indicate coordinates on the image, while the Z-axis indicates the luminance level.

Figure 2:
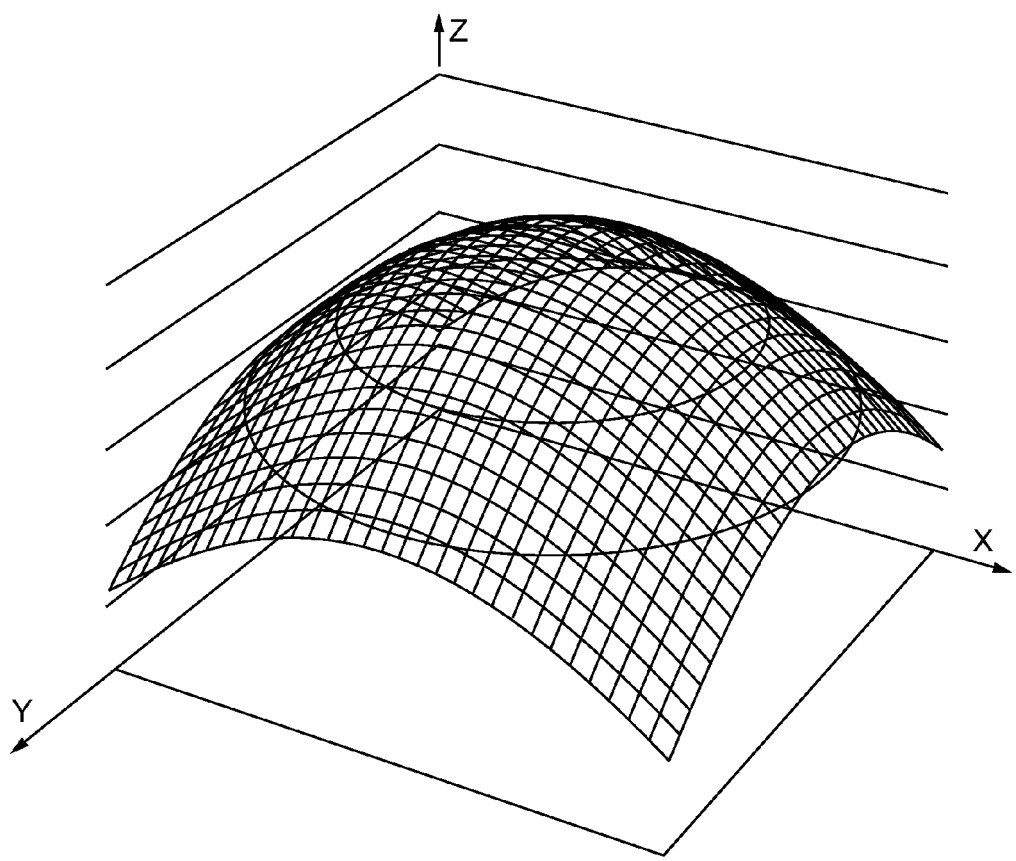
FIG. 2 is a diagram showing a luminance level distribution for a case of decreased marginal illumination.
Figure 3:
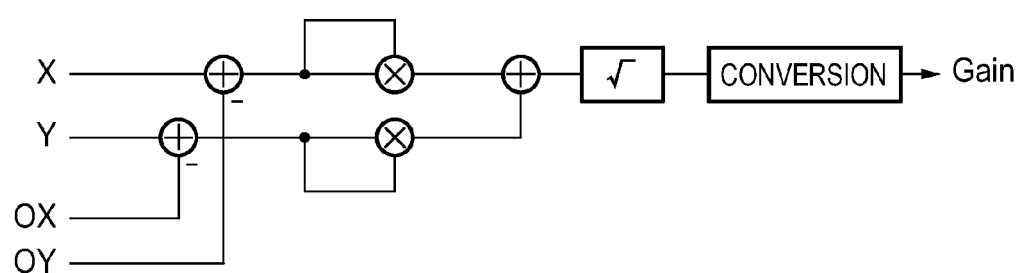
FIG. 3 is a diagram showing an example of a shading correction amount calculation circuit.

The shading correction amount calculation circuit 101 by computation calculates a gain for correcting the shape in FIG. 2 into a uniform one. The computation is performed using auxiliary information such as information on the characteristics of the imaging lens. As a method for calculating a shading correction gain, various methods have been proposed. For example, in a case where as in FIG. 2 the optical axis is in the image center position such that the decreased illumination is determined by the image height therefrom, a possible realization is by obtaining the image height using the optical axis center coordinates (OX, OY) and the coordinates of the pixel of interest (X, Y), and employing a conversion circuit with a line segment approximation of a conversion function that converts from the image height to the gain, as illustrated in FIG. 3.

The first signal processing circuit 102 carries out signal processing that has to be carried out before γ correction. This mainly is applicable to corrective processing and measures for countering problems that stem from the image sensor, such as noise reduction processing. While ordinary shading correction processing would apply shading correction gain before the first signal processing circuit 102, in the present embodiment shading correction is deliberately not performed at this point.

Figure 4:
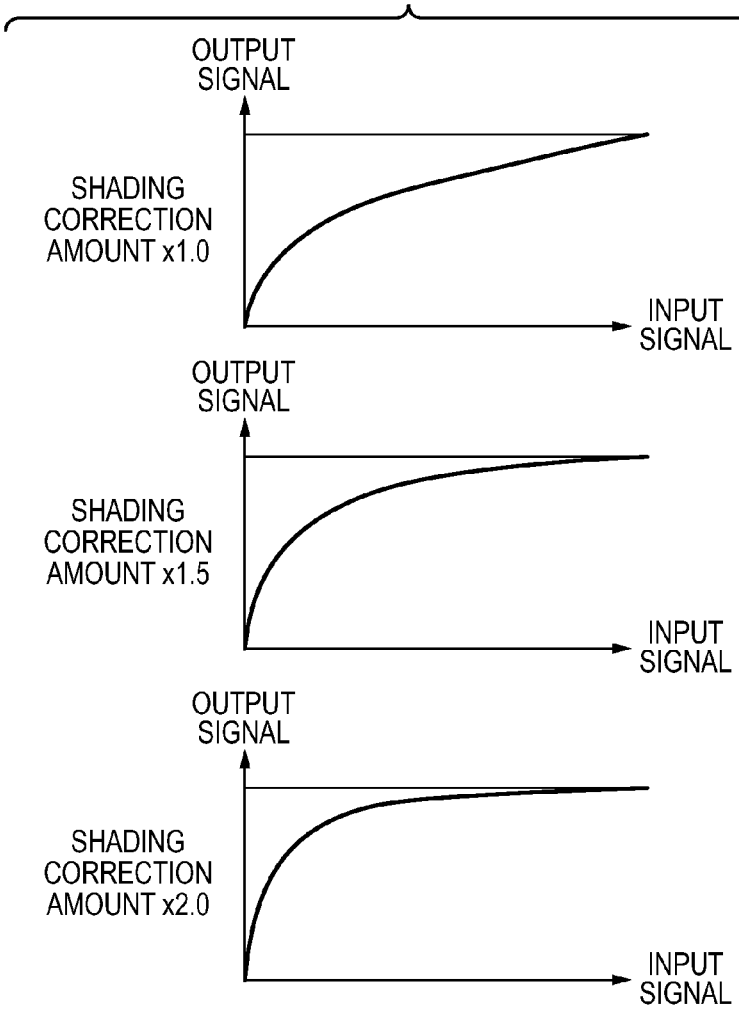
FIG. 4 is a diagram showing an example of fine-adjusting the γ correction curve in a γ correction gain calculating circuit.

The γ correction gain calculation circuit 103 fine-adjusts the γ correction curve intended to be applied to the image, in accordance with the shading correction gain. Fine-adjusting does not mean only simply mixing the γ correction curve and the shading correction gain, but adjusting the output level of the γ correction curve for high-luminance input, such that a signal that due to the shading correction would exceed a maximum value of the output signal will not be rounded off. A visualization of the result of the fine-adjustment is shown in FIG. 4.

Figure 5:
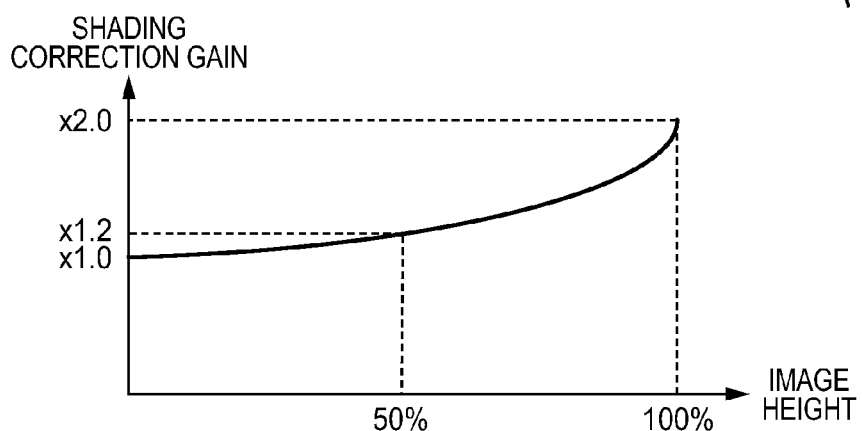
FIG. 5 is a diagram showing one example of a shading correction gain.

The method of adjusting the γ correction curve is explained in the following. FIG. 5 shows the shading correction gain in the present embodiment. By taking the distance on the image from the optical axis center position to a pixel position as image height, coefficients for the pixel values are given depending on the image height. Through multiplying the pixel values by these coefficients, images of subjects of uniform luminance are corrected to take on uniform luminance.

If the shading correction gain of FIG. 5 is applied to an input image, multiplication is at maximum by a 2-fold gain, in regions of large image height. In case of applying the γ correction of FIG. 6A to the image, which has pixel values in the range from 0% to 200% with respect to the input image, all input pixel values that lie between 100% and 200% would be substituted with 100%, causing detail in high-luminance portions to be lost.

In the present embodiment, the γ correction curve is modified by the shading correction gain in order to enable shading correction and γ correction to be carried out simultaneously. For example, from FIG. 5 the shading correction gain at image height 50% is 1.2-fold. Here, the γ correction curve 901, which is shown in FIG. 6A, is multiplied by a coefficient such that its output becomes 1.2-fold, and besides, the gain is lowered in the input pixel value range between 60% and 100%, such that it will not exceed 100% in high-luminance portions. A curve where this has been demonstrated is the γ correction curve 902 also including shading correction in FIG. 6B. Similarly, from FIG. 5 the shading correction gain at image height 100% is 2.0-fold. Here, the γ correction curve 903, which is shown in FIG. 6A, is multiplied by a coefficient such that its output becomes 2-fold, and besides, the gain is lowered in the input pixel value range from 20% to 100%, such that it will not exceed 100% in high-luminance portions. A curve where this has been demonstrated is the γ correction curve 904 also including shading correction in FIG. 6C.

Figure 7A:
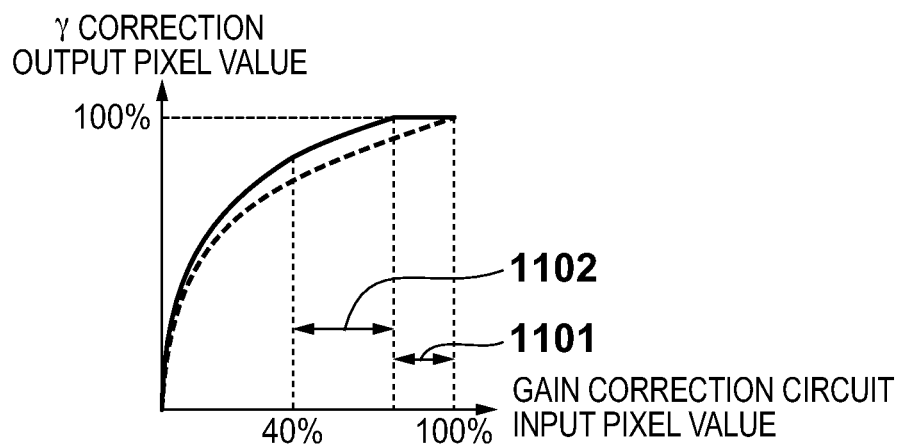
FIGS. 7A and 7B are diagrams showing examples of adjusting the γ correction curve in the first embodiment.
Figure 7B:
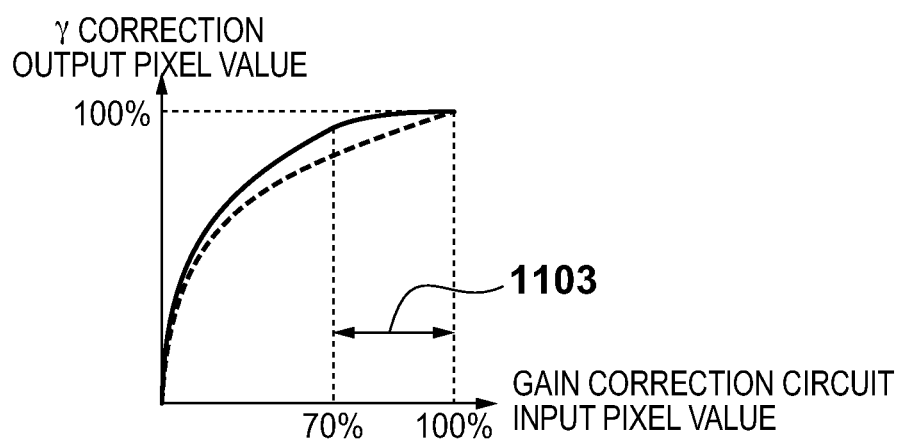

Also permissible is a correction curve that, without making use of all pixel values that would exceed 100% due to the shading correction, substitutes with 100% in extremely bright portions. While input pixel values from 60% to 100% for a 1.2-fold shading correction gain and input pixel values from 20% to 100% for a 2-fold shading correction gain have been given as examples of the range in which the γ correction curve is adjusted, this range is decided depending on the image quality requirements to be fulfilled. For example, the modification range for the γ correction curve is selected according to whether importance is attached to contrast or to gradation properties. For the case of the shading correction gain being 1.2-fold, FIG. 7A gives an example of a γ correction gain curve in case of contrast being important, and FIG. 7B gives an example of a γ correction gain curve in case of gradation properties being important.

For example, in case of contrast being regarded as important, a range 1101 rounded off to 100% due to saturation is allowed to remain to a small extent, with a comparatively wide range 1102 being taken in which the shading correction gain is weakened. In case of gradation properties being regarded as important, the range rounded off at 100% due to saturation is either eliminated or made smaller, and a comparatively narrow range 1103 taken in which the shading correction gain is weakened. In this way, an appropriate γ correction curve is chosen depending on the image requirements to be emphasized.

The gain correction circuit 104 is adapted to multiply the output signal of the first signal processing circuit 102 by a gain correction coefficient that is obtained from the γ correction curve fine-adjusted according to the output signal level. With respect to the output signal of the gain correction circuit 104, the second signal processing circuit 105 carries out signal processing that has to be carried out after γ correction. This applies, for example, to a color space transformation to transform an RGB signal into a YUV signal, edge enhancement processing and so on. The output terminal 106 outputs the signal from the second signal processing circuit to a desired output destination.

Because in the present embodiment a signal before shading correction is fed into the first signal processing circuit, processing can be free of influence from rounding-off computation due to shading correction saturation processing (processing to replace values that after multiplication by the gain exceed a maximum value, with the maximum value). Also, because processing at the time of γ correction is performed so as to retain high-luminance portions, loss of detail in high-luminance portions at pixels of large shading correction gain is reduced.

Regarding the present embodiment, it has to be kept in mind that the first signal processing refers to an image not having shading correction applied (Even for subjects of the same luminance, the luminance level of image formation may differ by image-forming position).

(Second Embodiment)

Figure 8:
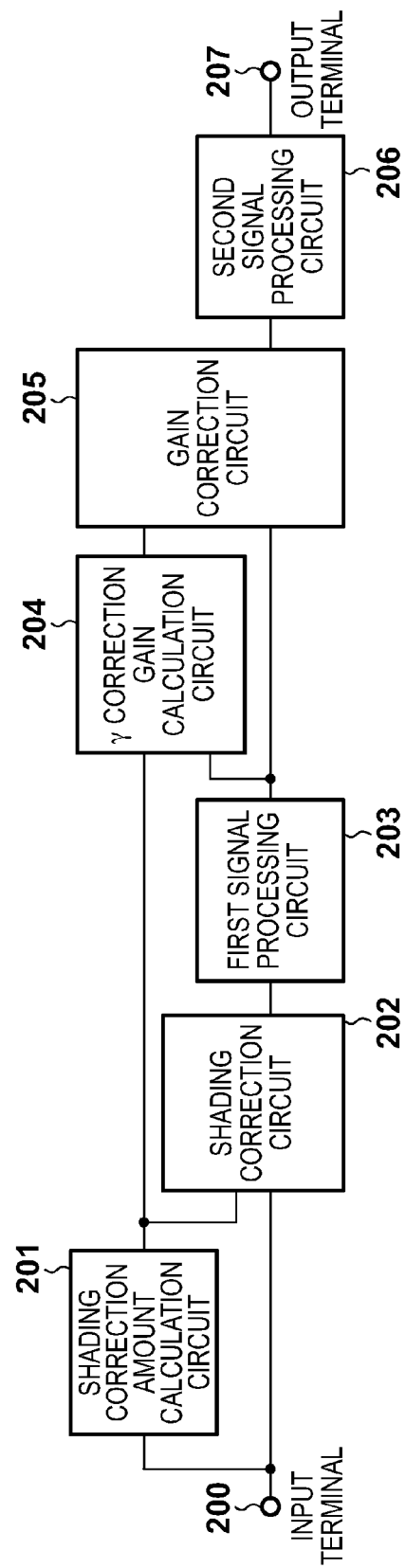
FIG. 8 is a block diagram of an image processing apparatus according to a second embodiment of the present invention.

FIG. 8 is a block diagram of an image processing apparatus according to a second embodiment of the present invention. While serving the same purpose as in the first embodiment, its configuration is slightly different.

The image processing apparatus includes an input terminal 200 for inputting an image formed by an image sensor, and a shading correction amount calculation circuit 201 for calculating by pixel a shading correction amount to be applied to the image inputted from the input terminal 200. The image processing apparatus also includes a shading correction circuit 202 for carrying out shading correction based on the shading correction amount, and a γ correction gain calculation circuit 204 for calculating a γ correction gain based on the shading correction amount. Further, the image processing apparatus includes a first signal processing circuit 203 for carrying out signal processing with respect to the output of the shading correction circuit 202, based on the γ correction gain. Moreover, the image processing apparatus includes a gain correction circuit 205 for applying γ correction to the output of the first signal processing circuit 203, a second signal processing circuit 206 for carrying out signal processing with respect to the output of the gain correction circuit 205, and an output terminal 207 for outputting the signal of the second signal processing circuit.

What differs from the first embodiment is the part that, using the output of the shading correction amount calculation circuit 201, shading correction is carried out in advance, independently of γ correction.

In the present embodiment, the output of the shading correction circuit 202 has been configured with a greater bit width than the input, to provide a condition under which saturation processing due to the shading correction is unlikely to be applied. For example, if configuring the output with 16 bits, in a case where the input is provided as 12-bit pixel values, there are 4 bits in reserve such that for up to 16-fold shading correction, no rounding-off due to saturation processing will be performed.

Figure 9A:
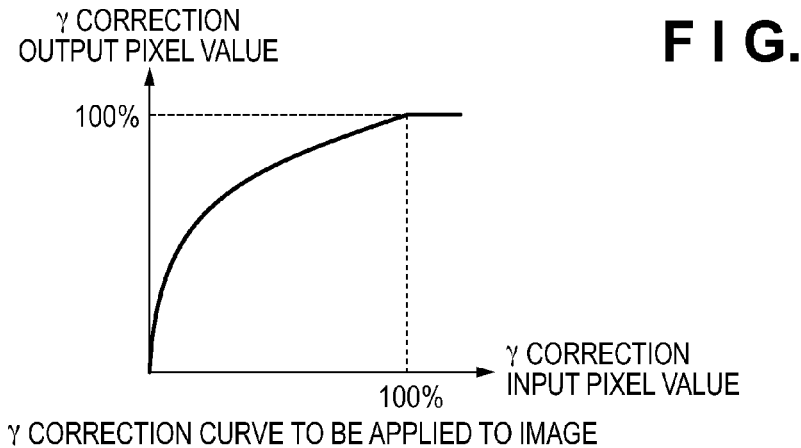
FIGS. 9A to 9C are diagrams showing examples of adjusting the γ correction curve in the second embodiment.

In the present embodiment, unlike in the first embodiment, pixel values to which shading correction has been applied are fed into the gain correction circuit 205. Because the shading correction amount varies depending on the image height, the value that can be taken as maximum value varies with the image height. While FIG. 9A shows a γ correction curve to be applied to an input image, this γ correction curve is used after adjusting it according to the shading correction amount.

Figure 9B:
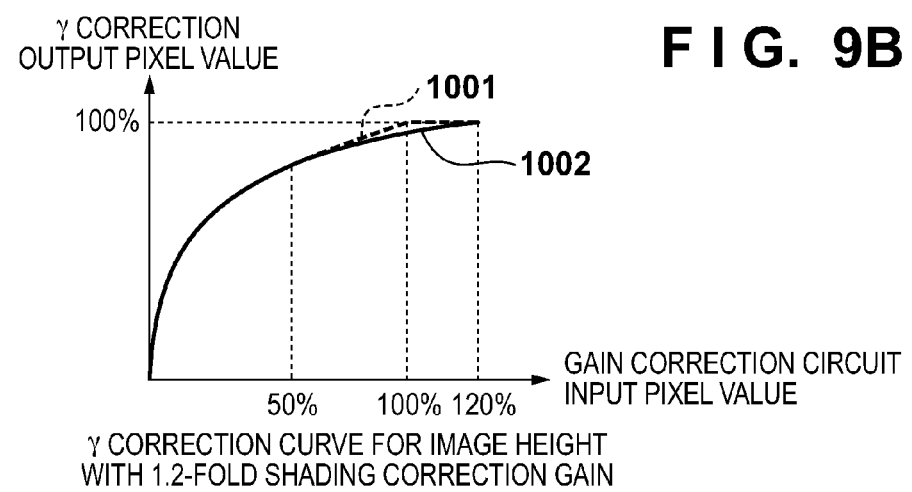

For example, from FIG. 5 the shading correction gain at image height 50% is 1.2-fold. Consequently, due to a 120% gain being present over the pixel values that were input from the input terminal 200, the γ correction curve is expanded to 120%. FIG. 9B is a γ correction curve where at this point, rather than expanding the entire length of the γ correction curve, only the γ correction curve in a high-luminance portion was expanded while letting that in the low-luminance portion agree with the desired γ correction curve given in FIG. 9A.

Figure 9C:
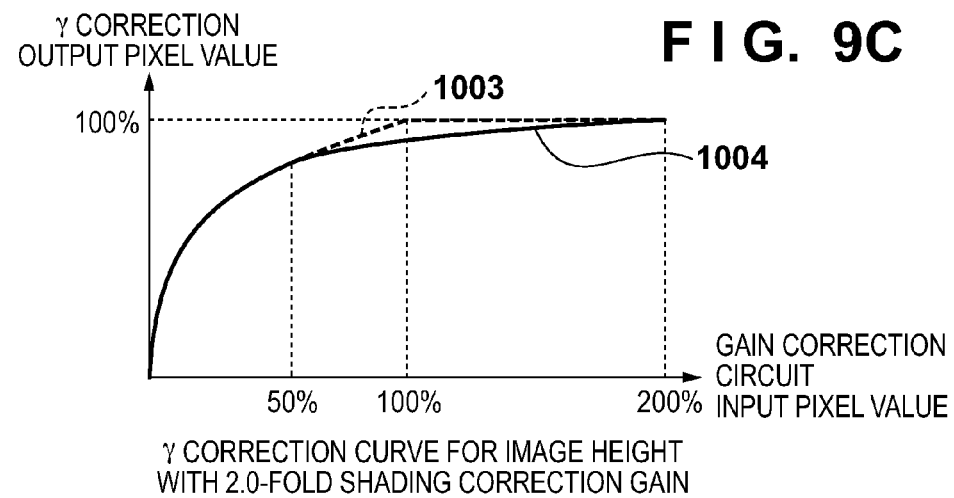

Similarly, from FIG. 5 the shading correction gain at image height 100% is 2.0-fold. FIG. 9C is a γ correction curve in which the γ correction curve in a high-luminance portion has been adjusted in accordance with this gain.

Figure 10A:
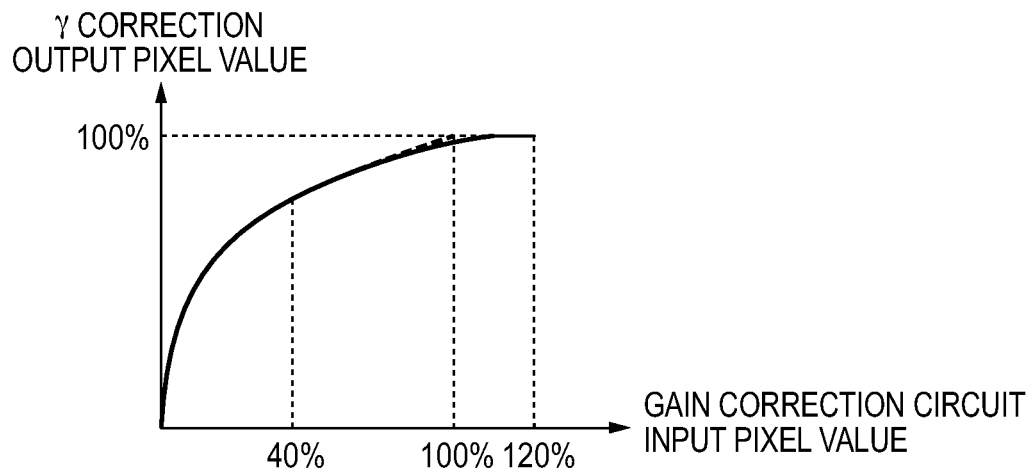
FIGS. 10A and 10B are diagrams showing examples of adjusting the γ correction curve in the second embodiment.
Figure 10B:
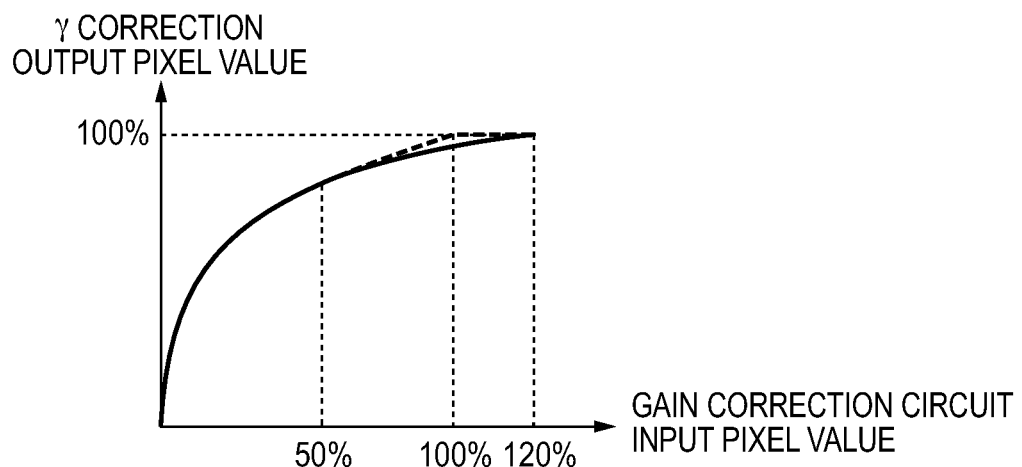

While in the γ correction curve adjustment shown in FIGS. 9B and 9C, the γ correction curve was modified in the range of input pixel values from 50% to 100%, it does not have to be that range. The range is decided depending on the image quality requirements to be fulfilled. For example, the modification range for the γ correction curve is selected according to whether importance is attached to contrast or to gradation properties. For the case of the shading correction gain being 1.2-fold, FIG. 10A gives an example of a γ correction gain curve in case of contrast being important, and FIG. 10B gives an example of a γ correction gain curve in case of gradation properties being important. However, a method of uniformly expanding the entire length is not employed.

Compared to the first embodiment, there is a tendency in the present embodiment for the computation bit width of the first signal processing to become larger, leading to an increased circuit size. Nevertheless, it can have a similar configuration as in common shading correction.

(Third Embodiment)

Figure 11:
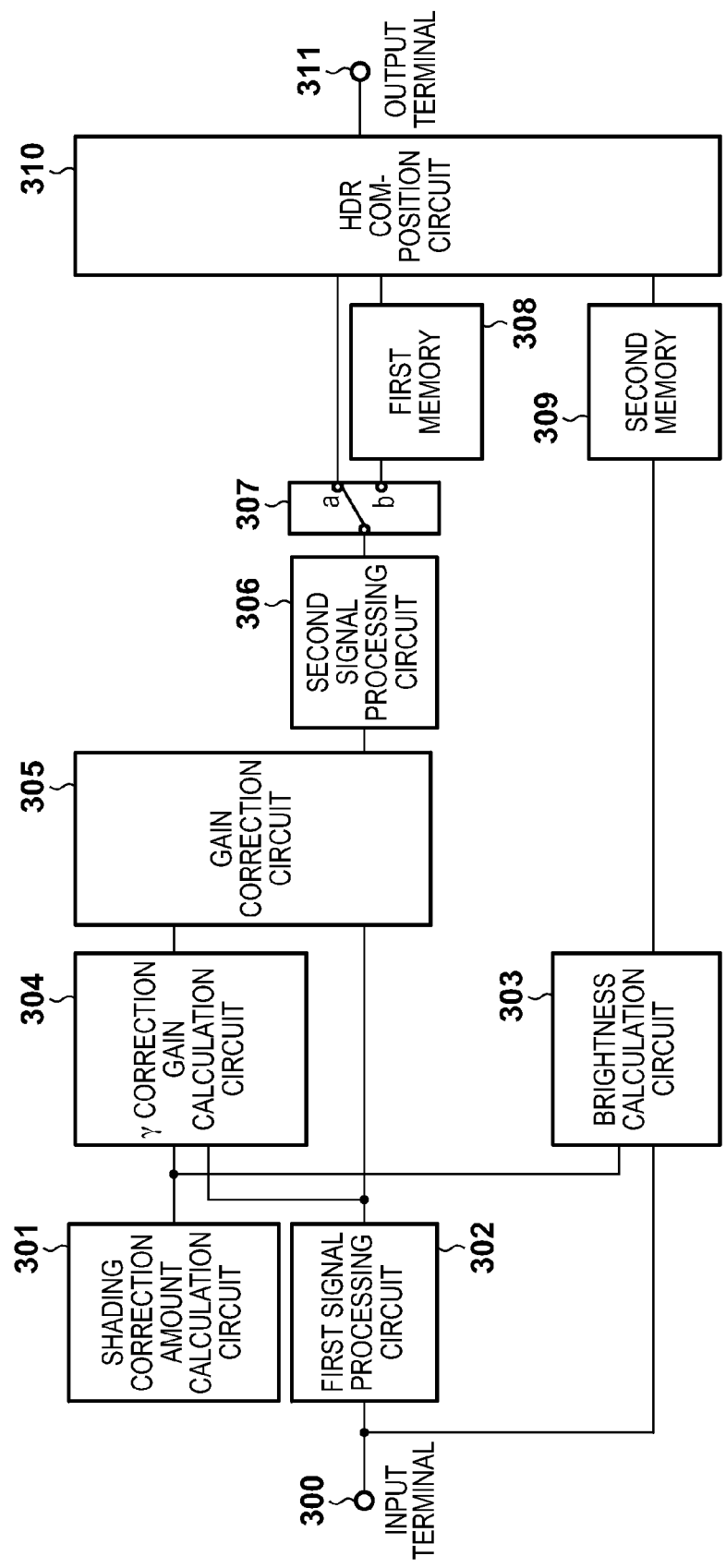
FIG. 11 is a block diagram of an image processing apparatus according to a third embodiment of the present invention.

FIG. 11 is a block diagram of an image processing apparatus according to a third embodiment of the present invention. As to the configuration, a brightness calculation circuit 303, an output selector 307, a first memory (first storage unit) 308, a second memory (second storage unit) 309, and an HDR composition circuit 310 have been added with respect to the configuration of the first embodiment.

The present embodiment is an example of an image processing apparatus, which takes two images as input and merges them to realize a dynamic range expansion (referred to below as HDR processing).

Initially, a first input image captured with short exposure time is inputted from the input terminal 300. The output of the second signal processing circuit 306 is obtained in the same way as in the first embodiment. By connecting the output selector 307 to side b, the output signal of the second signal processing circuit 306 is stored into the first memory 308.

The first input image is inputted also to the brightness calculation circuit 303, together with the output of the shading correction amount calculation circuit 301. The brightness calculation circuit 303 applies a low-pass filter to the first input image to remove fine detail (the high-range component), and applies shading correction based on the shading correction amount. However, the correction is performed such that, without completely removing the shading, a small amount of shading is retained. The correction result is referred to as brightness image. The brightness image is stored into the second memory 309.

Next, a second input image captured with a longer exposure time than the first input image is inputted from the input terminal 300. The output of the second signal processing circuit 306 is obtained in the same way as in the first embodiment. By connecting the output selector 307 to side a, it is inputted to the HDR composition circuit 310. The signal processing result from the first input image, which is stored in the first memory, and the brightness image, which is stored in the second memory, are simultaneously inputted to the HDR composition circuit 310 as well.

The HDR composition circuit 310, based on the brightness information read out from the second memory, merges the signal processing result from the second image with the signal processing result from the first image, read out from the first memory. For the specific composition process, for example, a method such as obtaining by linear interpolation using a ratio as shown in FIG. 12 can be mentioned.

In the γ correction gain calculation circuit 304, different curves are used as the γ correction curve for the case of the first input image and the case of the second input image. The γ correction curves are selected for use such that in the case of the first input image the gain coefficient in the low-luminance portion becomes large, and in the case of the second input image detail in the high-luminance portion is not compressed much.

In the present embodiment, due to the intentional retaining of a small amount of shading when shading correction is applied in the brightness calculation circuit 303, the regions with shading, more than the regions without shading, come to actively adopt the second input image. It does not matter which of the first input image and the second input image is the image that was captured first.

In accordance with the foregoing, the above-described embodiments, due to methods that simultaneously carry out shading correction and γ correction, and besides, compress luminance levels rather than letting saturation occur in high-luminance portions, reduce loss of detail in high-luminance portions that were captured in regions where shading exists.

Further, in cases where—especially if high-luminance portions are colored—only particular colors are subject to saturation processing, the above-described embodiments can provide the effect of resolving or reducing the problem of color change occurring. Moreover, when HDR (High Dynamic Range) processing is carried out, the reproducibility of subject details in regions with shading is improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No.2011-247965, filed Nov. 11, 2011, which is hereby incorporated by reference herein in its entirety.

What is claimed is:

1. An image processing apparatus comprising:
an input unit for inputting an image captured by an image sensor;
a shading correction amount calculation unit for calculating per pixel a shading correction amount to be applied to the image inputted from the input unit;
a gamma (γ) correction gain calculation unit for calculating a γ correction gain depending on the shading correction amount and pixel values of the image sensor pixels; and
a gain correction unit for applying gain correction to the pixel values based on the γ correction gain;
wherein shading correction and γ correction are performed simultaneously by the gain correction with the gain correction unit;
wherein the input unit inputs a first input image captured with a short exposure time and a second input image captured with a longer exposure time than the first input image,
the image processing apparatus further comprising:
a brightness calculation circuit for calculating a brightness by region on-image based on the first input image and the shading correction amount;
a first memory unit for storing the result of γ-correcting the first input image;
a second memory unit for storing the brightness by region; and
a composition unit for merging the image stored in the first memory unit and the γ correction result from the second input image based on the brightness information stored in the second memory unit.

2. An image processing method comprising:
an input step of inputting an image captured by an image sensor;
a shading correction amount calculation step of calculating a shading correction amount per pixel to be applied to the image inputted by the input step;
a gamma (γ) correction gain calculation step of calculating a γ correction gain depending on the shading correction amount and pixel values of the image sensor pixels; and
a gain correction step of applying gain correction to the pixel values based on the γ correction gain;
wherein shading correction and γ correction are performed simultaneously by the gain correction in the gain correction step;
wherein the input step inputs a first input image captured with a short exposure time and a second input image captured with a longer exposure time than the first input image,
the method further comprising: a brightness calculation step of calculating a brightness by region on-image based on the first input image and the shading correction amount;
a first storage step of storing the result of γ-correcting the first input image;
a second storage step of storing the brightness by region; and
a composition step of merging the image stored in the first storage step and the γ-correction result from the second input image, based on the brightness information stored in the second storage step.

* * * * *